United States Patent [19]

Bolie

[11] 4,017,205
[45] Apr. 12, 1977

[54] VERTICAL AXIS WINDMILL

[76] Inventor: Victor W. Bolie, 7504 American Heritage NE., Albuquerque, N. Mex. 87109

[22] Filed: Nov. 19, 1975

[21] Appl. No.: 633,387

[52] U.S. Cl. .................................... 415/2; 98/72
[51] Int. Cl.² ........................................ F03D 7/00
[58] Field of Search ............................ 415/1–4; 92/15, 72; 290/44, 54, 55

[56] References Cited

UNITED STATES PATENTS

| 335,388 | 2/1886 | Serdinko | 415/3 |
| 372,148 | 10/1887 | Henderson | 415/4 |

FOREIGN PATENTS OR APPLICATIONS

| 1,062,631 | 12/1953 | France | 415/4 |
| 3,672 | 2/1883 | France | 415/4 |
| 15,369 | 1893 | United Kingdom | 98/72 |

Primary Examiner—Henry F. Raduazo
Attorney, Agent, or Firm—Head, Johnson & Chafin

[57] ABSTRACT

A vertical axis windmill is taught having a horizontal base, preferably circular in configuration, sitting on the earth's surface, a dome having a horizontal bottom spaced above the base supported on a plurality of columns to provide an annular space below the dome bottom, a conical baffle positioned on the base below the dome, the conical axis being coincidental with the vertical axis of the dome, the dome having a circular roof orifice therein coaxial with the axis of the conical baffle, a vertical shaft supported coaxially by the conical baffle and an impeller affixed to the shaft and positioned in the dome circular orifice. Wind blowing relative to the windmill causes a lifting force by the aerodynamic effect of the dome, the wind passing upwardly through the annular opening and upwardly through the dome orifice, imparting rotational energy to the impeller. Power using apparatus such as generators or the like may be attached to the rotating vertical shaft. An alternate embodiment includes the utilization of a plurality of vertical vanes between the base and the dome, exterior of the conical baffle to more effectively direct the flow of air upwardly through the dome orifice.

8 Claims, 4 Drawing Figures

VERTICAL AXIS WINDMILL

BACKGROUND, SUMMARY AND OBJECTS OF THE INVENTION

This invention is generally related to the conversion of wind energy into useful rotary-shaft power and is particularly related to solving the problem longstanding of designing a structurally durable windmill which will operate safely in harsh climate conditions. The invention achieves the desired result by utilizing a single vertical axis mount without outrigger guy wires and while preserving omni-directional wind sensitivity. Other features of the windmill of this invention include inherently good snow and ice protection, expeditious means of power takeoff coupling, and an aesthetically appealing design.

Wind has long been used as a means of providing energy although at the present time only a small percent of the energy consumed by mankind is extracted from wind. With the imminent shortage of fossil fuels increasing interest exists in utilization of wind energy.

Most windmills in use today employ a horizontal axis. One problem with horizontal axis windmills is that of providing a suitable support structure, which adds greatly to the cost of such design. Another problem is that of maintaining omni-directional sensitivity of the horizontal shaft, and a third problem is that of coupling the rotational shaft to energy using or converting means, such as generators, etc.

To overcome these disadvantages of horizontal axis windmills attempts have been made to provide vertical axis designs for extracting energy from wind. These typically have included cup-anemometer schemes, hoop-air foil designs and other methods. However, none have been totally successful because of structural difficulty, inefficient performance, unpleasantness of visual appearance and cost of construction per unit of energy extracted.

The present invention is directed towards a vertical axis windmill having the advantages of requiring only a single axis of rotation. A further advantage is its omni-directional sensitivity coupled with pleasing aesthetic appearance. The windmill has inherent structural rigidity to accommodate harsh climates of heavy rains, snow, hail and windstorms.

It is therefore an object of this invention to provide a novel single vertical axis windmill which is properly responsive to varying wind speed and is insensitive to wind direction.

Another object of this invention is to provide a vertical axis windmill which is adaptable to large sizes and pleasing in appearance.

Still another object of this invention is to provide a vertical axis windmill having a minimum number of moving parts and which is susceptible of design to resist snow, ice, rain and windstorms.

Still another object of this invention is to provide a novel stationary windmill for converting air flow from any horizontal direction into an upward flow through a vertical axis impeller.

These general objects as well as other and more specific objects of the invention will be fulfilled in the following description and claims, taken in conjunction with the attached drawings.

DESCRIPTION OF THE VIEWS

SUMMARY OF THE INVENTION

A vertical axis windmill is provided which is particularly adaptable for areas of harsh climate wherein rugged construction and durability are paramount requirements, but which may be effectively utilized in all areas where wind offers a recoverable source of energy. The invention includes a base positioned on the earth's surface having a truncated hemispherical dome supported on pillars above the base. The truncation of the dome provides a roof orifice therein and the pillars allow wind to pass under the dome and upwardly through the orifice. Positioned on the base below the dome is a conical baffle, the apex of the conical baffle being below the dome. The conical baffle supports a vertical shaft extending upwardly through the dome orifice. Affixed to the shaft is an impeller of diameter slightly less than the diameter of the orifice. Wind passing the structure is deflected upwardly by the aerodynamic effect of the dome and the conical baffle, the upward flow of the wind past the impeller serving to apply rotational energy to the vertical shaft. An energy consuming device, such as a generator, pump or the like, may be housed interiorly of the conical baffle.

In an important alternate embodiment, vertical vanes are provided between the base, the lower interior surface of the dome and the exterior surface of the conical baffle, the vanes serving to more effectively direct wind flow upwardly past the impeller.

DETAILED DESCRIPTION

Figure 2:
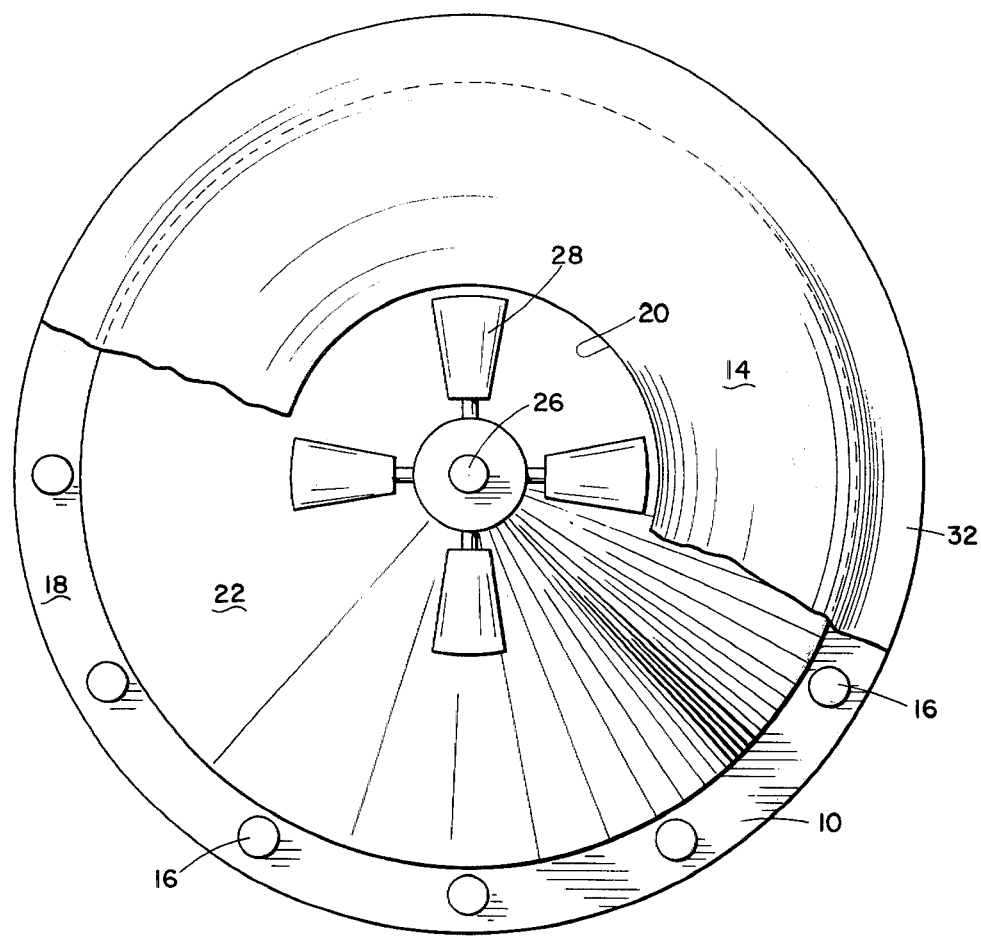
FIG. 2 is a top view of the embodiment of FIG. 1 with the dome portion shown partially cut away.
Figure 1:
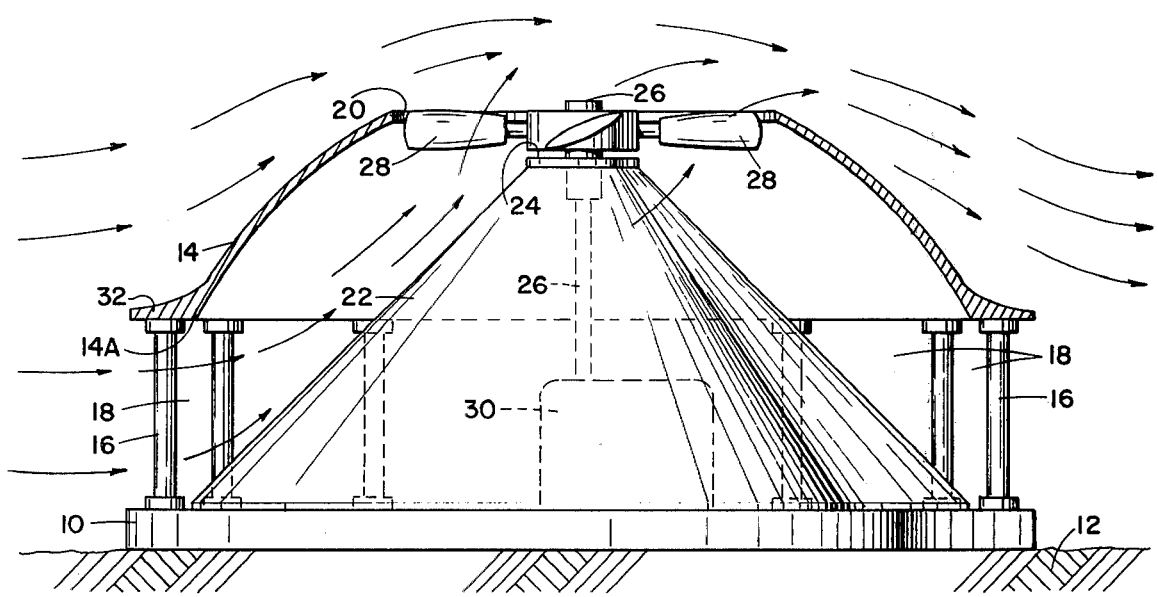
FIG. 1 is an elevational side view, shown partially in cross section, of an embodiment of the invention.

Referring to FIGS. 1 and 2 a basic structure employing the invention is illustrated. A base 10 is supported on the earth's surface 12. Positioned above the base 10 is a dome 14 which preferably is of truncated hemispherical configuration. The dome bottom 14A is supported above the base 10, such as by means of spaced columns 16, providing an annular passageway 18.

The truncation of the dome 14 provides a central roof circular orifice 20.

Positioned on the base 10 and coaxial with the dome 14 is a conical baffle 22. In the illustrated arrangement the conical baffle 22 is truncated to provide a top 24 spaced below and coaxial with the roof orifice 20. Supported by the conical baffle 22 is a vertical shaft 26 which extends upwardly through roof orifice 20. Affixed to shaft 26 is an impeller 28, the diameter of which is slightly less than the diameter of orifice 20.

An energy consuming device, such as a generator 30, may be positioned within the interior of the conical baffle 22, coupled with vertical shaft 26.

Wind flow, indicated by the arrows in FIG. 1, causes an upward component of flow through the circular orifice 20 and thereby past the impeller 28, imparting rotational energy. This upward flow is induced primarily by the aerodynamic effect of the dome roof 14. To improve the aerodynamic characteristics an integral circumferential horizontal rim portion 32 may be employed.

It can be seen that the design of FIGS. 1 and 2 fulfills the objectives initially set forth. The apparatus is inherently structurally rigid, is omni-directional, is pleasing in appearance, and is inherently adapted to harsh weather, including ice and snow conditions. The dome 14 and conical baffle 22 provide inherent weather protection for the equipment and particularly the energy consuming equipment 30 which may be effectively located in the interior of the conical baffle 22.

Figure 4:
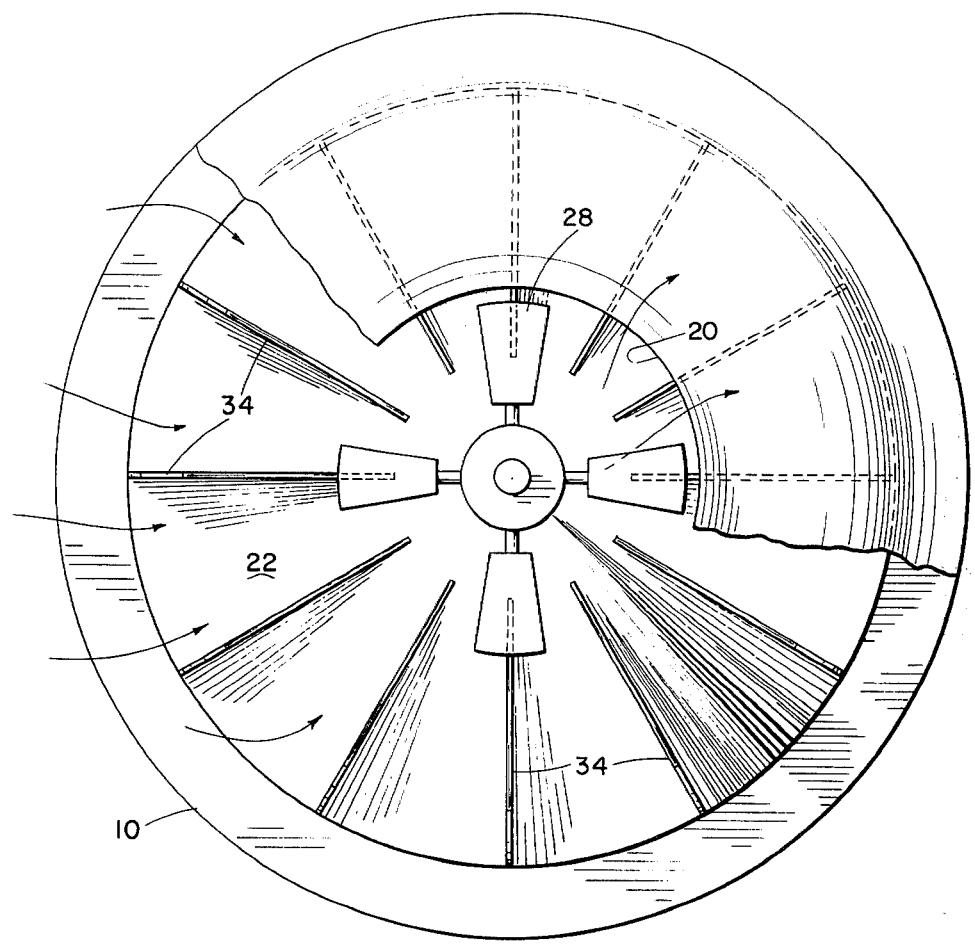
FIG. 4 is a top view as shown in FIG. 2 but showing the alternate design having the vertical vanes of FIG. 3.
Figure 3:
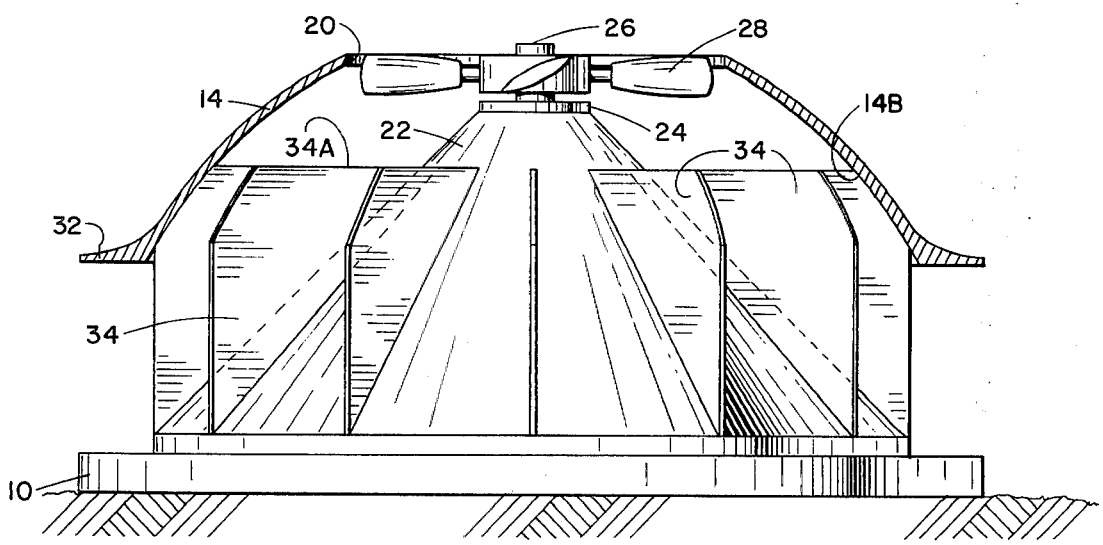
FIG. 3 is a view as shown in FIG. 1 but showing an alternate design including the use of a plurality of vertical vanes for more effectively directing the wind flow upwardly through the impeller.

FIGS. 3 and 4 show an alternate arrangement of the invention. Essentially this arrangement is the same as described with reference to FIGS. 1 and 2 except that a plurality of vertical vanes 34 are employed. These vanes extend from the base 10 to the upper interior surface 14B of the dome and extend perpendicularly to the surface of conical baffle 22. The tops 34A of the vanes are below impeller 28. Wind from any direction is more effectively directed upwardly through the roof orifice 20 by vanes 34 for more effective extraction of energy by impeller 28. In this embodiment the vanes 34 may also serve as means to support dome 34 thereby eliminating the columns utilized in the embodiment of FIG. 1.

As previously indicated the dome 14 is preferably of a semi-hemispherical construction, with the base 10 being preferably in the form of a pad of substantially the same diameter. The diameter of impeller 28 is preferably about ½ the diameter of the semi-hemispherical dome 14. The height of the dome bottom 14A above base 10, that is, the height of the annular passageway 18, should be about equal to or greater than the radius of impeller 28. The height of the vane tops 34A above base 10 should be about 75% of the height of the dome 14A at the circular orifice 20.

Numerous other embodiments and extensions of the principle of this invention may be employed without departing from its essential concepts. For example, the structural heights and diameters can be modified independently, if desired, and the dome roof could be of a single-curvature cone configuration. A variable pitch impeller may be employed. Shaft 26 may be extended upwardly and provided with a cap-disk serving as an anchor point for guy wires slanting downwardly and outwardly to support the blade tips of a large diameter impeller. For smoother upward air flow the underside 14B of the dome may be fitted with a "lamp shade" flaring having in the vertical plane a curvature opposite to that of the dome. Further, for stronger bracing against torsional twists a set of thin tension cables can be used to connect the bottom of each roof support pillar 16 to the top of each of the two neighboring pillars. Another foreseeable improvement includes a trolley-mounted semi-circular wall positioned just inside the downstream half of the roof support pillars to replace the segmented vanes.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:
1. A windmill comprising:
   a horizontal base;
   a dome having a horizontal bottom spaced above said base and having a central circular orifice in a horizontal plane;
   means to support said dome above said base providing an annular air inlet between the base and the dome bottom;
   a conical baffle supported on said base below said dome, the conical axis thereof being coincidental with the vertical axis of said dome circular orifice;
   a vertical shaft supported coaxially in said conical baffle; and
   an impeller affixed to said shaft and rotatably positioned in said plane of said dome circular orifice.
2. A windmill according to claim 1 wherein said dome is of truncated semi-hemispherical configuration.
3. A windmill according to claim 1 wherein said means to support said dome above said base comprises spaced apart vertical pillars extending from said base to said dome bottom.
4. A windmill according to claim 2 including an integral circumferential horizontal brim around the bottom of said dome.
5. A windmill according to claim 2 wherein the diameter of said impeller is about ½ the diameter of said hemispherical dome.
6. A windmill according to claim 2 wherein the height of said dome bottom above said base is at least equal to the radius of said impeller.
7. A windmill according to claim 1 including:
   a plurality of spaced apart vertical vanes supported on said base and extending to the lower interior surface of said dome, the top of each vane being below said impeller, and each vane contacting said conical baffle perpendicular the surface thereof.
8. A windmill according to claim 7 wherein said plurality of vertical vanes provide said means to support said dome above said base.

* * * * *